United States Patent [19]

Pajot et al.

[11] 4,292,295
[45] Sep. 29, 1981

[54] HIGHLY REACTIVE ALUMINA AND PROCESS FOR THE PREPARATION THEREOF

[75] Inventors: Michel Pajot; Laurent Seigneurin, both of Salindres, France

[73] Assignee: Rhone-Poulenc Industries, Paris, France

[21] Appl. No.: 174,659

[22] Filed: Aug. 1, 1980

Related U.S. Application Data

[63] Continuation of Ser. No. 51,172, Jun. 22, 1979, abandoned.

[30] Foreign Application Priority Data

Jul. 26, 1978 [FR] France ................................ 78 22095

[51] Int. Cl.³ .......................... C01F 7/30; C01F 7/02
[52] U.S. Cl. .................................. 423/625; 423/628; 423/630; 423/631
[58] Field of Search ............... 423/625, 628, 630, 631, 423/419 P

[56] References Cited

U.S. PATENT DOCUMENTS

| | | | |
|---|---|---|---|
| 2,888,323 | 5/1959 | Teichner | 423/631 |
| 3,264,061 | 8/1966 | Kehl | 423/419 P |
| 3,264,062 | 8/1966 | Kehl et al. | 423/419 P |
| 3,472,787 | 10/1969 | Kucirka | 423/625 |
| 3,743,709 | 7/1973 | Shaw | 423/419 P |
| 4,034,067 | 7/1977 | Seigneurin | 423/462 |
| 4,053,579 | 10/1977 | Kato et al. | 423/631 |
| 4,225,639 | 9/1980 | Matyasi | 423/630 |
| 4,242,328 | 12/1980 | Hem | 423/630 |

FOREIGN PATENT DOCUMENTS 2277039  1/1976  France ................................ 423/462

OTHER PUBLICATIONS

Newsome, *Alumina Properties*, Technical Paper No. 10, 2nd Rev., Aluminum Co. of America, Pittsburgh, Pa. (1960), pp. 68–71.

*Primary Examiner*—Brian E. Hearn
*Attorney, Agent, or Firm*—Herbert F. Schwartz

[57] ABSTRACT

The invention relates to a new highly reactive alumina and the method of preparing it. The alumina is characterized by an amorphous structure and a specific surface of greater than 600 m²/g. It is prepared by thermal decomposition of the double carbonate of aluminum and ammonium of the formula $AlNH_4CO_3(OH)_2$ at a temperature of between about 200° and 500° C.

Aluminum hydroxychlorides of the formula $Al_2(OH)_xCl_{6-x}$ can be prepared from it.

4 Claims, 2 Drawing Figures

ANGLE DEGREES 2 THETA

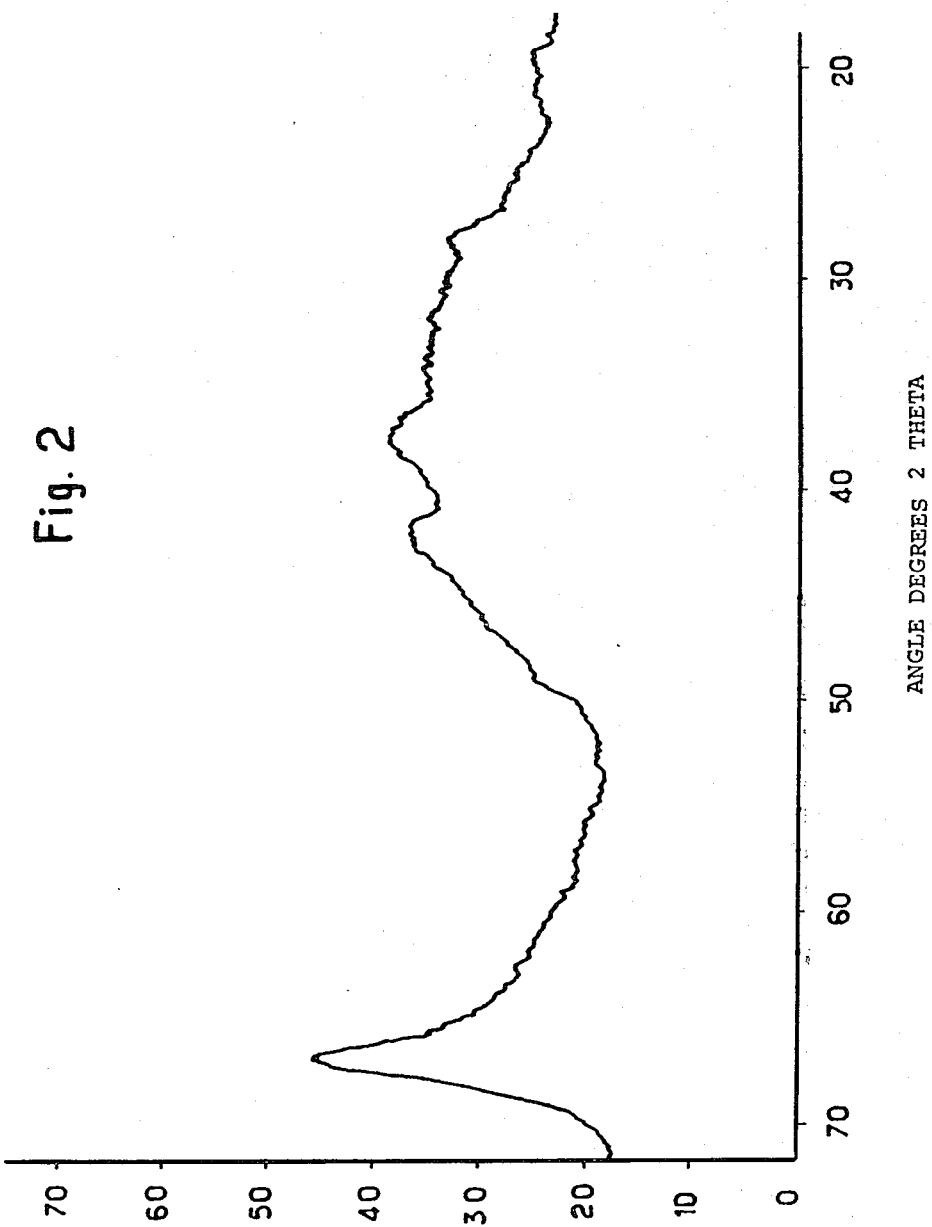

HIGHLY REACTIVE ALUMINA AND PROCESS FOR THE PREPARATION THEREOF

This is a continuation, of application Ser. No. 51,172, filed June 22, 1979, now abandoned.

BACKGROUND OF THE INVENTION

This invention relates to a new alumina and the method of preparing it. It also concerns the method for the preparation of aluminum hydroxychloride therefrom. More particularly, the alumina with which the present invention is concerned is a highly reactive alumina having a very high specific surface.

French patent application No. 73.36846, published under No. 2,247,425, describes active aluminas having a specific surface of at least 200 to 250 m$^2$/g. These active aluminas are prepared by partial dehydration of alumina hydrates (hydrargillite) in a stream of hot gases. This same French application describes the preparation of aluminum hydroxychlorides of the general formula Al$_2$(OH)$_x$Cl$_{6-x}$ which consists in reacting the above alumina with solutions of hydrochloric acid and/or aluminum chloride.

French application for certificate of addition No. 74.22968, published under No. 2,277,039, describes active aluminas having a specific surface of between 250 and 600 m$^2$ per gram. They are obtained by partial dehydration of alumina gels obtained by precipitation of aluminum salts or of sodium aluminate. This French application also describes the use of this active alumina for the preparation of aluminum hydroxychlorides.

The active character of the aluminas used makes it possible to obtain aluminum hydroxychlorides in which "x" in the above formula may in the first case (active alumina obtained from hydrargillite) reach a value of 4 and in the second case (active alumina obtained from amorphous gels), a value of 5.

The interest which exists in being able to obtain aluminum hydroxychlorides of the general formula Al$_2$(OH)$_x$Cl$_{6-x}$ in which x=5 is known. It is from Al$_2$(OH)$_5$Cl that alumina balls are prepared by the so-called "oil drop" or "salt gel" technique which is well known to those skilled in the art.

However, the alumina described in the aforementioned French Application for Certificate of Addition, while it makes it possible to obtain an aluminum hydroxychloride of the formula Al$_2$(OH)$_5$Cl, has a certain number of drawbacks, the main ones being due to the structure itself of this alumina.

As a matter of fact, the activated alumina obtained by partial dehydration of amorphous gels contains a certain amount of gamma-alumina. This gamma-alumina reacts poorly in production of Al$_2$(OH)$_5$Cl. Thus, the reaction of the alumina obtained from amorphous gels with solutions of hydrochloric acid and/or aluminum chloride is not quantitative, and the yield observed is only about 80 to 90%. Another drawback, which is related to the structure of the alumina used, resides in the rather long time of reaction required for the preparation of aluminum hydroxychloride. This reaction time is directly related to the specific surface of the alumina. As a matter of fact, the higher the specific surface, the greater the surface of contact and the faster the reaction velocity.

On the other hand, it is known from U.S. Pat. No. 4,053,579 that the decomposition at about 223° C. of a special double carbonate of aluminum and ammonium gives alumina of gamma-structure, the area of this gamma-alumina being between about 200 and 400 m$^2$/g.

The foregoing clearly shows the interest which resides in being able to have alumina which has a specific surface and a crystallographic structure which are adapted to improve its reactivity.

The present invention achieves this purpose while obviating the drawbacks of the prior art which have been pointed out above.

It is, therefore, an object of the present invention to provide a new highly reactive alumina, especially adapted to produce aluminum hydroxychloride.

It is also an object of the present invention to provide a process for the preparation of the new highly reactive alumina.

It is a further object of the present invention to provide a process for producing aluminum hydroxychlorides from the new highly reactive aluminas.

Other objects will be apparent to those skilled in the art from the present description, taken in conjunction with the appended drawings, in which:

FIG. 2 is an X-ray diffraction pattern of an amorphous alumina gel of the prior art, prepared according to Example 3, below.

GENERAL DESCRIPTION OF THE INVENTION

Figure 1:
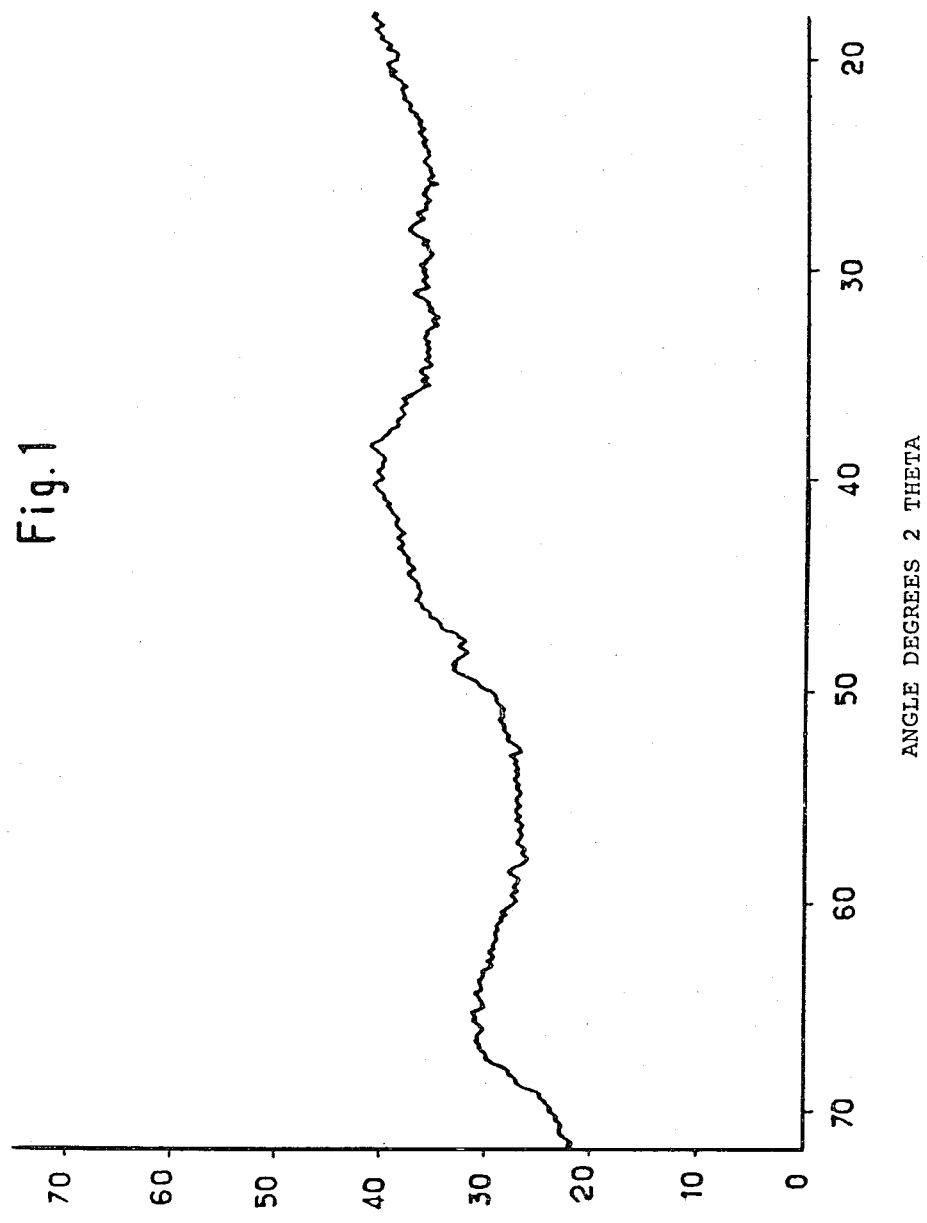
FIG. 1 is an X-ray diffraction pattern of the new alumina of Example 2, below.

By the present invention there has been discovered a new alumina having a specific surface of more than 600 m$^2$/g and an amorphous structure. Within the meaning of the present invention, there is understood by amorphous structure a structure such that X-ray analysis gives a diagram which no longer shows lines characteristic of a crystalline phase.

Another important object of the invention is a process of preparing an alumina as described above, which process comprises thermally decomposing a double carbonate of aluminum and ammonium having the formula AlNH$_4$CO$_3$(OH)$_2$ at a temperature of between about 200° and 500° C. for approximately a period of time of between a fraction of a second and about 5 hours.

The double carbonate of aluminum and ammonium of the formula AlNH$_4$CO$_3$(OH)$_2$ which is decomposed in accordance with the process of the invention is substantially crystalline. It preferably has an X-ray diffraction pattern the interplanar distances and relative intensities of which have approximately the following values:

| d A | 1/1$_1$ | d A | 1/1$_1$ | d A | 1/1$_1$ |
| --- | --- | --- | --- | --- | --- |
| 5.82 | 100 | 2.57 | 25 | 1.815 | 2 |
| 4.07 | 21 | 2.25 | 5 | 1.729 | 12 |
| 3.41 | 10 | 2.19 | 7 | 1.657 | 7 |
| 3.32 | 44 | 2.038 | 20 | 1.465 | 3 |
| 2.90 | 18 | 1.991 | 9 | 1.429 | 6 |
| 2.63 | 2 | 1.879 | 2 | 1.410 | 3 |
|  |  |  |  | 1.388 | 3 |

The decomposition is preferably carried out at a temperature of between about 275° C. and 325° C., for a period of time of between about a fraction of a second and 3 hours.

The decomposition in a fraction of a second is effected at a relatively high temperature, the specific surface of the alumina obtained having a tendency to decrease when the temperature and/or the time of decomposition increase. The decomposition between a fraction of a second (about 1/10 of a second) and about 10 seconds can advantageously be obtained in suitable devices by means of hot gases.

A relatively low temperature requires a longer time of decomposition, the specific surface of the alumina thus obtained varying relatively little when the time of decomposition increases.

Within the temperature and time ranges indicated above, the man skilled in the art can thus easily determine, by simple routine trials, the conditions to be employed in order to obtain the alumina of amorphous structure and specific surface greater than 600 m²/g of the present invention.

The operation is generally carried out at atmospheric pressure, but other pressures may be employed.

Still another object of the invention is a process of preparing aluminum hydroxychlorides of the formula $Al_2(OH)_xCl_{6-x}$, in which x is equal to or greater than 5, which process comprises reacting alumina of the invention with a solution of hydrochloric acid and/or aluminum chloride.

The hydrochloric acid solution used preferably has a concentration of between about 1 and 5 N. Values outside of this range are not excluded. When the concentration is less than about 1 N, the reaction times become very high. On the other hand, when the concentration increases, the concentration of alumina in the final aluminum hydroxychloride increases. This latter point is important since, for instance, if the aluminum hydroxychloride obtained is used to prepare alumina balls by the "oil drop" technique which has been mentioned above, the concentration of alumina in the aluminum hydroxychloride must be preferably between 200 and 300 g/l. This value is obtained by using a hydrochloric acid solution of about 3 N.

When an aluminum chloride solution is used, its concentration preferably varies between about 0.25 M/L and 1.7 M/L. When it is desired to obtain a hydroxychloride which can be used in the oil drop process, a concentration of 1 M/L is preferred.

With respect to the reaction temperature, when operating with a hydrochloric acid solution, since the reaction is exothermal, no initial heating is necessary. The temperature increases spontaneously and is then maintained at a suitable value. The mixture is preferably maintained at the boiling point. When aluminum chloride is used, the reaction is not exothermal. It is, therefore, necessary to heat the reaction mixture, preferably up to its boiling point.

The alumina and hydrochloric acid or aluminum chloride solution are generally used in a molar ratio of $Al_2O_3$ to HCl of between about 0.95 and 1.05.

Under the foregoing conditions of temperature and concentration, the reaction time is generally between about 3 hours and 5 hours.

It is preferred to operate at atmospheric pressure, although higher or lower pressures may be employed.

The advantages of such a process reside primarily, on the one hand, in the considerably slower reaction times than the processes of the prior art (this will become clearly evident from the examples) and, on the other hand, in the fact that it is not necessary to use an excess of alumina as was previously true in the prior art. These advantages are due to the very high reactivity of the amorphous alumina of very high specific surface in accordance with the invention.

The double carbonate of aluminum and ammonium can be prepared by any technique known to the man skilled in the art. In particular, one can start from aluminum triisopropanolate and ammonium bicarbonate.

The hydroxychlorides can be used, for instance, for the preparation of alumina balls by the "oil drop" technique as previously mentioned. They can also be used in other applications, among which particular reference may be had to the treatment of waters.

SPECIFIC DESCRIPTION OF THE INVENTION

In order to disclose more clearly the nature of the present invention, the following examples illustrating the invention are given. It should be understood, however, that this is done solely by way of example and is intended neither to delineate the scope of the invention nor limit the ambit of the appended claims. In the examples which follow, and throughout the specification, the quantities of material are expressed in terms of parts by weight, unless otherwise specified.

EXAMPLE 1

Preparation of double carbonate of aluminum and ammonium $AlNH_4CO_3(OH)_2$.

Into 300 cc. of absolute benzene at 25° C., containing 1 mol of aluminum triisopropanolate, there is poured, with strong agitation, 1 mol of ammonium bicarbonate which is free of moisture. Agitation is continued for 5 hours, whereupon 100 cc. of water are added. The double carbonate of aluminum and ammonium $AlNH_4(OH)_2CO_3$, which has precipitated out, is removed by filtration and washed with water and then with alcohol. The double carbonate of aluminum and ammonium is then dried under vacuum at 40° C.

Analysis by X-ray diffraction gives the following interplanar spacings and relative intensities:

| d A | $1/l_1$ | d A | $1/l_1$ | d A | $1/l_1$ |
|-----|---------|-----|---------|-----|---------|
| 5.82 | 100 | 2.57 | 25 | 1.815 | 2 |
| 4.07 | 21 | 2.25 | 5 | 1.729 | 12 |
| 3.41 | 10 | 2.19 | 7 | 1.657 | 7 |
| 3.32 | 44 | 2.038 | 20 | 1.465 | 3 |
| 2.90 | 18 | 1.991 | 9 | 1.429 | 6 |
| 2.63 | 2 | 1.879 | 2 | 1.410 | 3 |
|  |  |  |  | 1.388 | 3 |

EXAMPLE 2

Preparation of amorphous alumina of very high specific surface of the invention from double carbonate of aluminum and ammonium.

860 g. of double carbonate of aluminum and ammonium obtained in the manner described in Example 1, above, are introduced into a muffle-type furnace which is maintained at a temperature of 300° C. The double carbonate is left in the furnace for 3 hours. 350 g. are obtained of a product comprising 90% $Al_2O_3$ and 10% $H_2O$.

The alumina obtained has a specific surface measured by the BET method of 650 m²/g.

Analysis by X-ray diffraction shows an amorphous structure. The X-ray diffraction pattern diagram obtained is shown in FIG. 1 of the drawings.

In order to be able to compare the structure of an alumina in accordance with the invention, produced by the foregoing example, with an active alumina of high-specific surface of the prior art, the following preparation was carried out:

EXAMPLE 3

Preparation of an active alumina of high specific surface from amorphous alumina gel (prior art).

A dry amorphous alumina of 70% $Al_2O_3$ is introduced into a flash dehydrator whose temperature gradient varies from 500° to 800° C.

After a residence time of a fraction of a second, there is removed a product which comprises about 95% $Al_2O_3$ and 5% $H_2O$.

A final product is obtained which has a specific surface of 375 $m^2/g$ and whose X-ray diagram is shown in FIG. 2 of the drawings.

A comparison of the X-ray diagrams ($\lambda Cu = 1.5405$ A) of FIGS. 1 and 2 clearly illustrates the difference in structure between the two aluminas. It is noted that the characteristic peak of the gamma-alumina at 67.03° angle 2-theta is present in FIG. 2 while it does not appear in FIG. 1.

EXAMPLE 4

The same procedure is employed as in Example 2, but employing a temperature of 330° C., for 3 hours.

The alumina obtained has an amorphous structure comparable to that shown in FIG. 1 and a specific surface of 667 $m^2/g$.

EXAMPLE 5

The same procedure is used as in Example 2, but employing a temperature of 370° C. for 3 hours.

The alumina obtained has an amorphous structure comparable to that shown in FIG. 1 and a specific surface of 625 $m^2/g$.

EXAMPLE 6

The same procedure is used as in Example 2, but employing a temperature of 250° C. for 5 hours.

The alumina obtained has an amorphous structure comparable to that illustrated in FIG. 1 and a specific surface of 640 $m^2/g$.

EXAMPLE 7

The same procedure is used as in Example 2, but employing a temperature of 400° C. for 2 hours.

The alumina obtained has an amorphous structure comparable to that shown in FIG. 1 and a specific surface of 605 $m^2/g$.

EXAMPLE 8

Preparation of aluminum hydroxychloride

Into an agitated apparatus of Grignard type there are introduced 1 liter gas a 3 N hydrochloric acid solution and then 350 g. of alumina which has been prepared in accordance with Example 2. The temperature of the reaction medium rises to 103° C. The mixture is maintained under reflux for 4 hours. After cooling to 20° C., there is obtained 1 liter of a solution of aluminum hydroxychloride of a density of 1.31, having the general formula $Al_2(OH)_{5.03}Cl_{0.97}$.

EXAMPLE 9

The same procedure is used as in Example 8, but employing 1 liter of a 1 M solution of aluminum chloride and 320 g. of alumina prepared in accordance with Example 2. The mixture is heated to reflux and maintained at this temperature for 4 hours. After cooling to 20° C., there is obtained 1 liter of a solution of aluminum hydroxychloride of a density of 1.31 and the general formula $Al_2(OH)_{5.01}Cl_{0.99}$.

EXAMPLE 10

The same procedure is used as in Example 8, but employing 1 liter of a solution consisting of 0.5 liters of 1 M aluminum chloride and 0.5 liters of 3 N hydrochloric acid, followed by 335 g. of alumina. The temperature of the reaction medium rises to 101° C.

The mixture is maintained at reflux for 4 hours. After cooling to 20° C., there is obtained 1 liter of a solution of aluminum hydroxychloride of a density of 1.31 and the general formula $Al_2(OH)_{5.03}Cl_{0.97}$.

The importance of the process of the invention which has been illustrated in Examples 8, 9 and 10 is very evident from a comparison of these examples with the examples of the two French patent applications referred to above. It is noted that in the application published under No. 2,247,425, the reaction times are about 16 hours, the activated alumina being obtained from hydrargillite. In the application published under No. 2,277,039, in which the alumina used is obtained from amorphous alumina gel, the reaction times are about 7 hours. Furthermore, as indicated previously, in these two published patent applications an excess of alumina is necessary in order to carry out the reaction while such an excess is not necessary in Examples 8, 9 and 10 above.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. Highly reactive aluminum oxide ($Al_2O_3$) containing no more than about 10% water, said aluminum oxide having an amorphous structure and a specific surface of greater than about 600 $m^2/g$ and the X-ray diffraction pattern of FIG. 1.

2. A process of preparing highly reactive aluminum oxide ($Al_2O_3$), having an amorphous structure and a specific surface of greater than about 600 $m^2/g$., comprising thermally decomposing the double carbonate of aluminum and ammonium of the formula $AlNH_4CO_3(OH)_2$ at a temperature of between about 200° and about 500° C., for a period of time of between a fraction of a second and about 5 hours at atmospheric pressure, wherein the double carbonate has an X-ray diffraction diagram whose interplanar spacings and relative intensities have approximately the following values:

| d A | $I/I_1$ | d A | $I/I_1$ | d A | $I/I_1$ |
|---|---|---|---|---|---|
| 5.82 | 100 | 2.57 | 25 | 1.815 | 2 |
| 4.07 | 21 | 2.25 | 5 | 1.729 | 12 |
| 3.41 | 10 | 2.19 | 7 | 1.657 | 7 |
| 3.32 | 44 | 2.038 | 20 | 1.465 | 3 |
| 2.90 | 18 | 1.991 | 9 | 1.429 | 6 |
| 2.63 | 2 | 1.879 | 2 | 1.410 | 3 |
|  |  |  |  | 1.388 | 3 |

3. A process according to claim 2, wherein the temperature is between about 275° C. and 325° C.

4. A process according to claim 2, wherein the period of time is between about a fraction of a second and about 3 hours.

* * * * *